United States Patent
Guo et al.

(10) Patent No.: US 10,439,412 B2
(45) Date of Patent: Oct. 8, 2019

(54) METHOD FOR ELIMINATING INTERFERENCE OF CHARGER TO TOUCH SCREEN, AND MOBILE TERMINAL

(71) Applicant: Guangdong Oppo Mobile Telecommunications Corp., Ltd., Dongguan, Guangdong (CN)

(72) Inventors: Mingqiang Guo, Guangdong (CN); Ziqing Guo, Guangdong (CN); Nan Peng, Guangdong (CN)

(73) Assignee: Guangdong Oppo Mobile Telecommunications Corp., Ltd., Dongguan (CN)

(*) Notice: Subject to any disclaimer, the term of this patent is extended or adjusted under 35 U.S.C. 154(b) by 262 days.

(21) Appl. No.: 15/488,622

(22) Filed: Apr. 17, 2017

(65) Prior Publication Data

US 2017/0220189 A1 Aug. 3, 2017

Related U.S. Application Data (63) Continuation of application No. PCT/CN2015/092099, filed on Oct. 16, 2015.

(51) Int. Cl.
*G06F 3/01* (2006.01)
*H02J 7/00* (2006.01)
*G06F 3/041* (2006.01)

(52) U.S. Cl.
CPC .......... *H02J 7/0045* (2013.01); *G06F 3/0418* (2013.01)

(58) Field of Classification Search
None
See application file for complete search history.

(56) References Cited

U.S. PATENT DOCUMENTS

| 2012/0169659 | A1 | 7/2012 | Welland |
| 2013/0342171 | A1 | 12/2013 | Grivas et al. |
| 2014/0267059 | A1 | 9/2014 | Deokar et al. |
| 2015/0193070 | A1* | 7/2015 | Tilak ............... G06F 3/0416 345/173 |
| 2015/0370410 | A1* | 12/2015 | Sauer ............... G06F 3/0418 345/173 |
| 2016/0064959 | A1* | 3/2016 | Jung ............... G06F 1/266 320/162 |

FOREIGN PATENT DOCUMENTS

| CN | 102841715 A | 12/2012 |
| CN | 103458340 A | 12/2013 |
| CN | 103995618 A | 8/2014 |
| CN | 104808847 A | 7/2015 |
| CN | 105144048 A | 12/2015 |
| CN | 107277249 A | 10/2017 |
| CN | 107728847 A | 2/2018 |

* cited by examiner

*Primary Examiner* — Joseph R Haley
(74) *Attorney, Agent, or Firm* — Young Basile Hanlon & MacFarlane, P.C.

(57) ABSTRACT

Provided is a method for eliminating the interference of a charger to a touch screen and a mobile terminal. The method can include the follows. A charging mode is determined. The charging mode includes a normal charging mode and a quick charging mode, and the quick charging mode has a charging current that is higher than the charging current of the normal charging mode. An interference frequency is determined according to the charging mode. A working frequency of the touch screen is determined according to the interference frequency.

20 Claims, 6 Drawing Sheets

METHOD FOR ELIMINATING INTERFERENCE OF CHARGER TO TOUCH SCREEN, AND MOBILE TERMINAL

CROSS-REFERENCE TO RELATED APPLICATION(S)

This application is a continuation of International Application No. PCT/CN2015/092099, filed on Oct. 16, 2015, the content of which is herein incorporated by reference in its entirety.

TECHNICAL FIELD

The present disclosure relates to the field of charging, and particularly to a method for eliminating the interference of a charger to a touch screen, and a mobile terminal.

BACKGROUND

At present, the charging current is increasing with the development of charging technology, and common-mode interferences result from a connected charger can seriously affect the performance of a touch screen. Currently, most of the touch screen manufacturers have adopted a frequency adaptive algorithm; among which, by detecting the interference frequency of the common-mode interference, a frequency band away from the interference frequency can be selected as a working frequency. However, the charging current is large when a quick charger is connected, and the frequency adaptive algorithm cannot solve the interference caused by the quick charger; even when a normal charger is connected, the frequency adaptive algorithm cannot solve the interference completely.

BRIEF DESCRIPTION OF THE DRAWINGS

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

DETAILED DESCRIPTION

Technical schemes of the implementations of the present disclosure will be described clearly and completely with reference to the accompanying drawings. The implementations described below are merely part of the present disclosure, and a person skilled in the art should be noted that, other implementations obtained on the basis of these exemplary implementations without creative work should fall into the protective scope of the present disclosure.

It should be noted that, mobile terminals according to the implementations of the present disclosure can have access to mobile communication networks and/or Ethernet. Via the mobile communication network, the mobile terminal can make or receive calls, send text messages as well as conduct other mobile communication services. The mobile communication network includes but not limited to: Global System of Mobile Communication (GSM) network, Code Division Multiple Access (CDMA) network, Wideband Code Division Multiple Access (WCDMA) network, Long Term Evolution (LTE) network, LTE Frequency Division Duplex (FDD) network, LTE Time Division Duplex (TDD) network, and future 5G communication networks. Via the mobile communication network and/or Ethernet, the mobile terminal can upload or download data, for example, download applications. The mobile terminal can be cell phones, tablet PCs (Portable Android Device, PAD), etc.

Implementation 1

Figure 1:
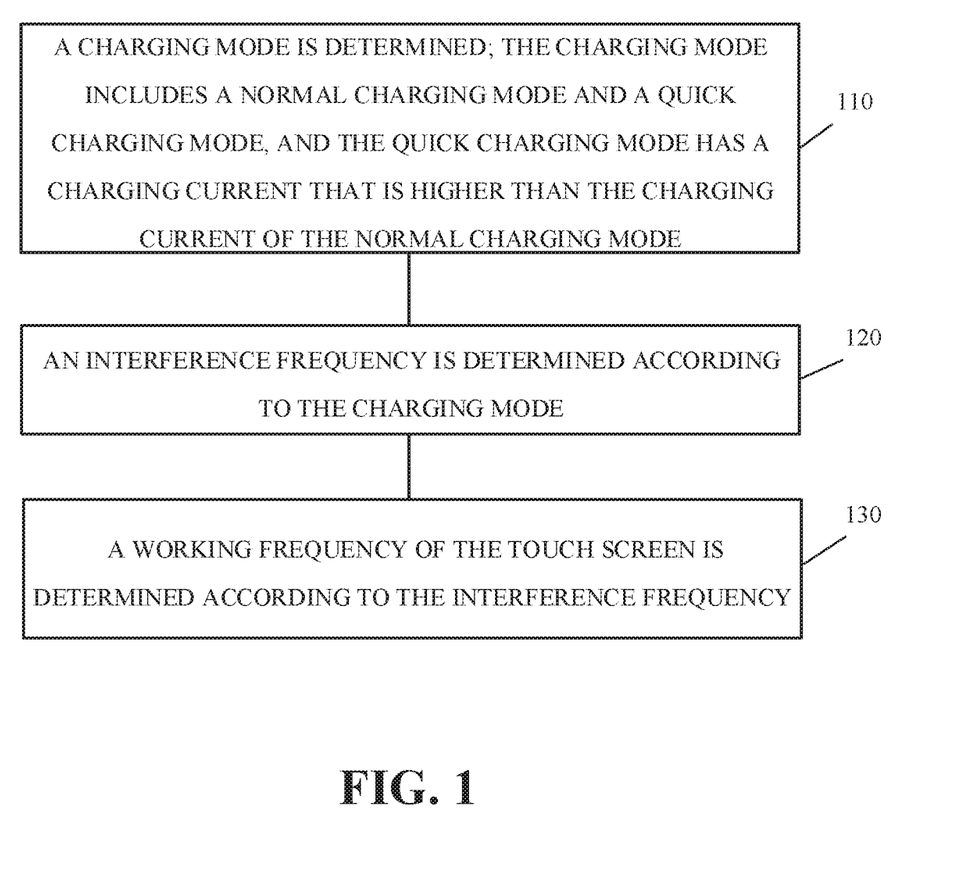
FIG. 1 is a schematic flow chart illustrating a method for eliminating the interference of a charger to a touch screen according to an implementation of the present disclosure.

FIG. 1 is a schematic flow chart illustrating a method for eliminating the interference of a charger to a touch screen according to an implementation of the present disclosure. As illustrated in FIG. 1, the method for eliminating interference can be executed at a mobile terminal and can begin at block 110.

At block 110, a charging mode is determined. The charging mode includes a normal charging mode and a quick charging mode, and the quick charging mode has a charging current that is higher than the charging current of the normal charging mode.

At block 120, an interference frequency is determined according to the charging mode.

At block 130, a working frequency of the touch screen is determined according to the interference frequency.

In the method for eliminating the interference of a charger to a touch screen according to an implementation of the present disclosure, after determining the charging mode, the mobile terminal can determine the interference frequency according to the determined charging mode and further determine the working frequency of the touch screen according to the determined interference frequency. In this way, appropriate methods for determining the interference frequency can be selected according to different charging modes, and the touch screen can operate normally with a working frequency different from the interference frequency. Therefore, the interference of the charger to the touch screen can be eliminated effectively and the control experience of the touch screen can be improved.

To be clear, in the implementation of the present disclosure, "interference frequency" refers to a frequency at which common-mode interference occurs when the mobile terminal is connected with the charger; "working frequency" of the touch screen refers to the scanning frequency of the touch screen. "Normal charging mode" can be regarded as a charging mode that charging with smaller charging current and has slow charging speed, and "quick charging mode" can be regarded as a charging mode that charging with larger charging current and has fast charging speed. For example, "quick charging" or "quick charging mode" means that, within about 30 minutes from the start of the charging, the mobile terminal can enter into a charging state where the average current is not less than 3 A or the total power charged is not less than about 60% of the rated capacity.

For the quick charging mode, due to the large charging current, for the sake of safety, real time monitoring of battery temperature will be required to achieve intelligent control of a charging process, so as to ensure the safety of charging.

Optionally, prior to the operation of block 110, the mobile terminal can determine whether the charger is plugged in. If it is determined that the charger is plugged into the mobile terminal, the mobile terminal can attempt to communicate with the charger. If the communication between the mobile terminal and the charger is successful, the charging mode will be identified as the quick charging mode; otherwise, if the communication is unsuccessful, the charging mode will be identified as the normal charging mode.

As can be seen, the mobile terminal can attempt to communicate with the charger after determining that the charger is plugged into the mobile terminal. Generally, the charger can be an ordinary charger, a quick charging charger, or other types of chargers. Based on this, the communication between the mobile terminal and the charger will be described below respectively.

Example 1

When charging with an ordinary charger, Universal Serial Bus (USB), or other power supply equipment, it is just to provide a VBUS voltage and will not communicate with a master Central Processing Unit (CPU) in the mobile terminal. Based on this, when the communication between the mobile terminal and the charger fails, a corresponding charging mode will be considered as the normal charging mode (or, referred to as "slow charging mode").

Example 2

Different from the ordinary charger or other power supply equipment, a quick charging charger is provided with an intelligent chip inside, and some data will be defined in advance by a master CPU of the mobile terminal. When the quick charging charger is plugged in, the charger will send data for handshake request to the master CPU. The master CPU will send an acknowledge signal to the charger if it is detected that the data for handshake request matches the data pre-defined previously. Once the request and response are completed successfully, the charger will be considered as a quick charging charger and the corresponding charging mode will be considered as the quick charging mode (or referred to as "fast charging mode"). For the sake of safety, the existence of any erroneous data or delay will be identified as a failure communication.

The process of determining the interference frequency performed at block 120 will be described below. As mentioned previously, in accordance with different charging modes, that is, for example, normal charging mode or quick charging mode, different methods can be selected to determine the interference frequency.

Example 1

The charging mode is the quick charging mode. In this case, at block 120, the frequency at which the touch screen is subject to a periodic interference will be determined to be the interference frequency.

More concretely, when charging with the quick charging mode, the charging current is relatively high, and the touch screen can be subject to an interference arising from a fixed frequency; at the fixed frequency, the touch screen can be subject to a periodic interference. Therefore, when charging with the quick charging mode, the frequency at which the touch screen is subject to the periodic interference can be determined to be the interference frequency.

In this implementation, optionally, when charging with the normal charging mode, the interference of the charger to the touch screen can be further reduced by decreasing the sensitivity of the touch screen.

Example 2

The charging mode is the normal charging mode. In this case, at block 120, a well known frequency adaptive algorithm will be adopted to determine the interference frequency.

For the determination of the working frequency of the touch screen performed at block 130, as an implementation, among multiple preset working frequencies, a preset working frequency that has a maximum difference with the interference frequency can be determined to be the working frequency of the touch screen.

As an example, the touch screen usually has multiple alternative working frequencies. Suppose the alternative working frequencies are 45 Hz, 50 Hz, 55 Hz, 60 Hz, and 70 Hz, and the interference frequency determined is 52 Hz, in this case, 70 Hz can be determined to be the working frequency of the touch screen. It should be understood that, 45 Hz or 60 Hz can be determined to be the working frequency of the touch screen either. That is to say, any alternative working frequency that different from the interference frequency can be identified as the working frequency of the touch screen. Alternatively, if the working frequency determined is close to the interference frequency, for example, the difference between the working frequency determined and the interference frequency is less than a preset threshold; the sensitivity of the touch screen can be decreased so as to further reduce the interference of the charger to the touch screen.

In this implementation, optionally, the mobile terminal can has a touch screen working frequency control register on a touch screen chip inside; numerical values of the working frequency can be written into the touch screen working frequency register so as to set the working frequency of the touch screen.

Implementation 2

Figure 2:
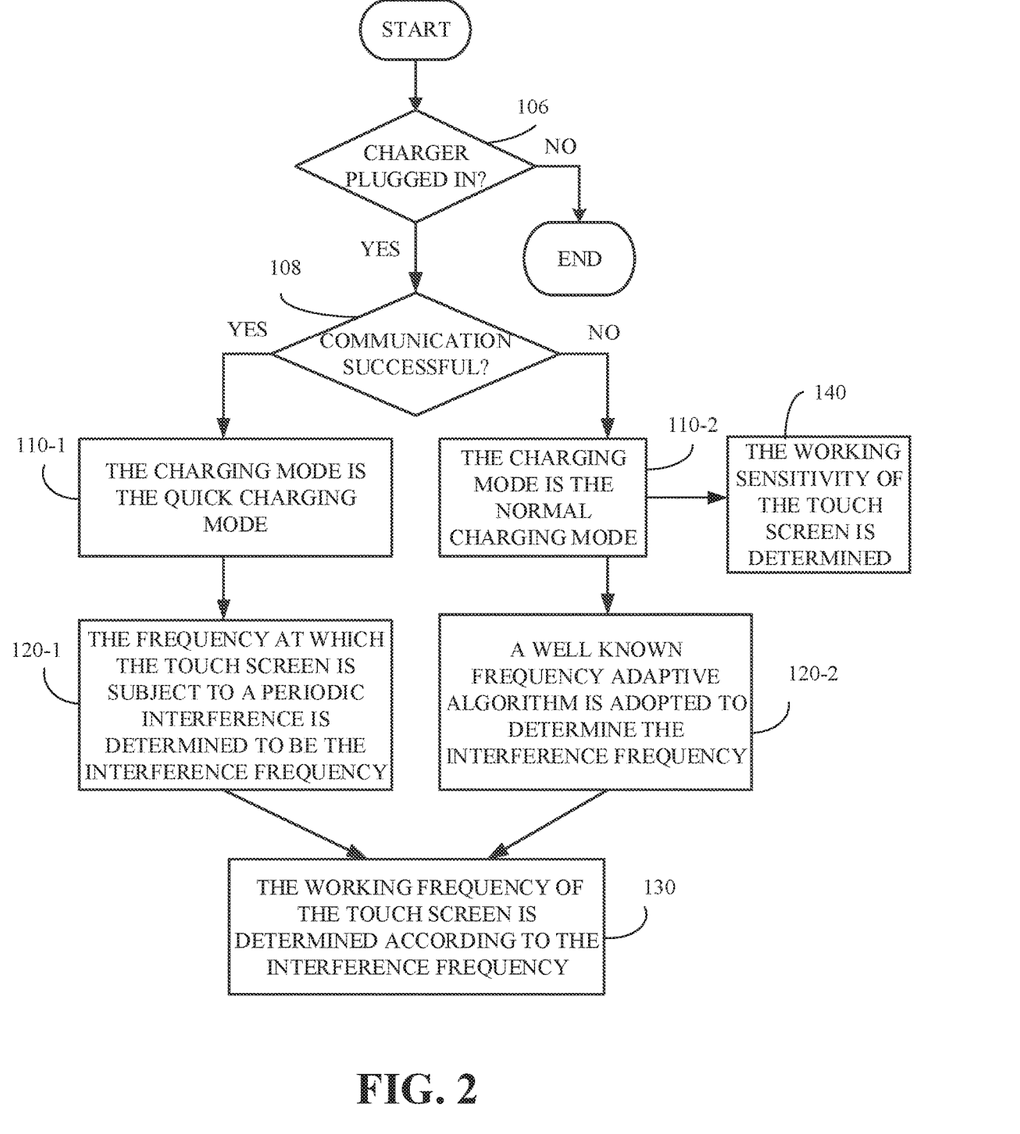
FIG. 2 is schematic flow chart illustrating the method for eliminating the interference of a charger to a touch screen according to another implementation of the present disclosure.

FIG. 2 is schematic flow chart illustrating the method for eliminating the interference of a charger to a touch screen according to another implementation of the present disclosure. In short, the method can be summarized as follows. Whether a charger is plugged in is determined. Communication between a mobile terminal and a charger is attempted to be established. A charging mode is determined in accordance with the communication. An interference frequency is determined in accordance with the charging mode, and then a working frequency is determined in accordance with the interference frequency.

As shown in FIG. 2, the method can be executed at a mobile terminal and can begin at block 108.

At block 106, it is determined that whether a charger is plugged in; if yes, proceed to block 108 to attempt to communicate with the charger.

At block 108, communication between the mobile terminal and the charger is attempted to be established. Thereafter, a charging mode is determined depending on whether the communication is successful.

As shown FIG. 2, if the communication is successful, at block 110-1, the charging mode will be identified as a quick charging mode. Based on the determination that the charging mode is the quick charging mode, at block 120-1, the frequency at which the touch screen is subject to a periodic interference will be determined to be the interference frequency, and at block 130, the working frequency of the touch screen can be determined according to the interference frequency.

On the other hand, as shown in FIG. 2, if the communication is unsuccessful, at block 110-2, the charging mode will be identified as a normal charging mode. Correspondingly, based on the determination that the charging mode is the normal charging mode, at block 120-2, a well known frequency adaptive algorithm will be adopted to determine the interference frequency; and similarly, at block 130, the working frequency of the touch screen can be determined according to the interference frequency.

In the case of normal charging mode, at block 140, a difference between the sensitivity of the touch screen when a charger is not plugged into the mobile terminal and a preset value can be determined to be the sensitivity of the touch screen.

The sensitivity of the touch screen will be described below in detail.

In other words, in the normal charging mode, the sensitivity of the touch screen can be decreased so as to further reduce the common-mode interference of the charger. Optionally, the preset value can be a value determined according to practical experimental experience; for example, the ratio of the preset value to the sensitivity of the touch screen when the charger is not plugged into the mobile terminal can be 1%, 2%, 4%, 5%, or 6%, and the present disclosure is not limited thereto.

As an implementation, different levels of sensitivity can be set in advance; during the actual charging process, according to the magnitude of charging current, sensitivity of different levels can be determined to be the sensitivity of the touch screen.

For example, the ratio of the preset value to the sensitivity of the touch screen when the charger is not plugged into the mobile terminal can be 5%.

Optionally, if it is determined that the charger is unplugged from of the mobile terminal, the mobile terminal will re-determine the sensitivity of the touch screen when the charger is not plugged into the mobile terminal to be the sensitivity of the touch screen. In other words, upon detecting that the charger is unplugged from the mobile terminal, the mobile terminal will restore the sensitivity of the touch screen to a normal sensitivity, and the touch screen can work in a frequency adaptive working mode.

As an implementation, the touch screen chip inside the mobile terminal can have a sensitivity control register. The sensitivity of the touch screen can be decreased by writing a sensitivity value in the sensitivity register.

Implementation 3

Hereinafter, the method for eliminating the interference of a charger to a touch screen according to the implementation of the present disclosure will be described in detail with reference to exemplary implementations. In this implementation, the sensitivity of the touch screen will be controlled according to the plugging state of the charger and/or the charging mode.

In this implementation, the mobile terminal can determine a preset flag used to indicate the charging mode; if it is determined that the charging mode is the quick charging mode, the preset flag will be set by the mobile terminal.

In other words, the mobile terminal can define a variable (flag), and set this variable to 1 (set) if it is determined that the charging mode is the quick charging mode, otherwise, set this variable to 0 (default value). Other functional units in the mobile terminal can determine the current charging mode according to the value of variable (flag) and perform subsequent operations in accordance with the determined charging mode.

It should be noted that, these examples are provided merely to provide one skilled in the art with better understanding of implementations of the present disclosure and not intended to limit the scope of the implementations of the present disclosure.

Figure 3:
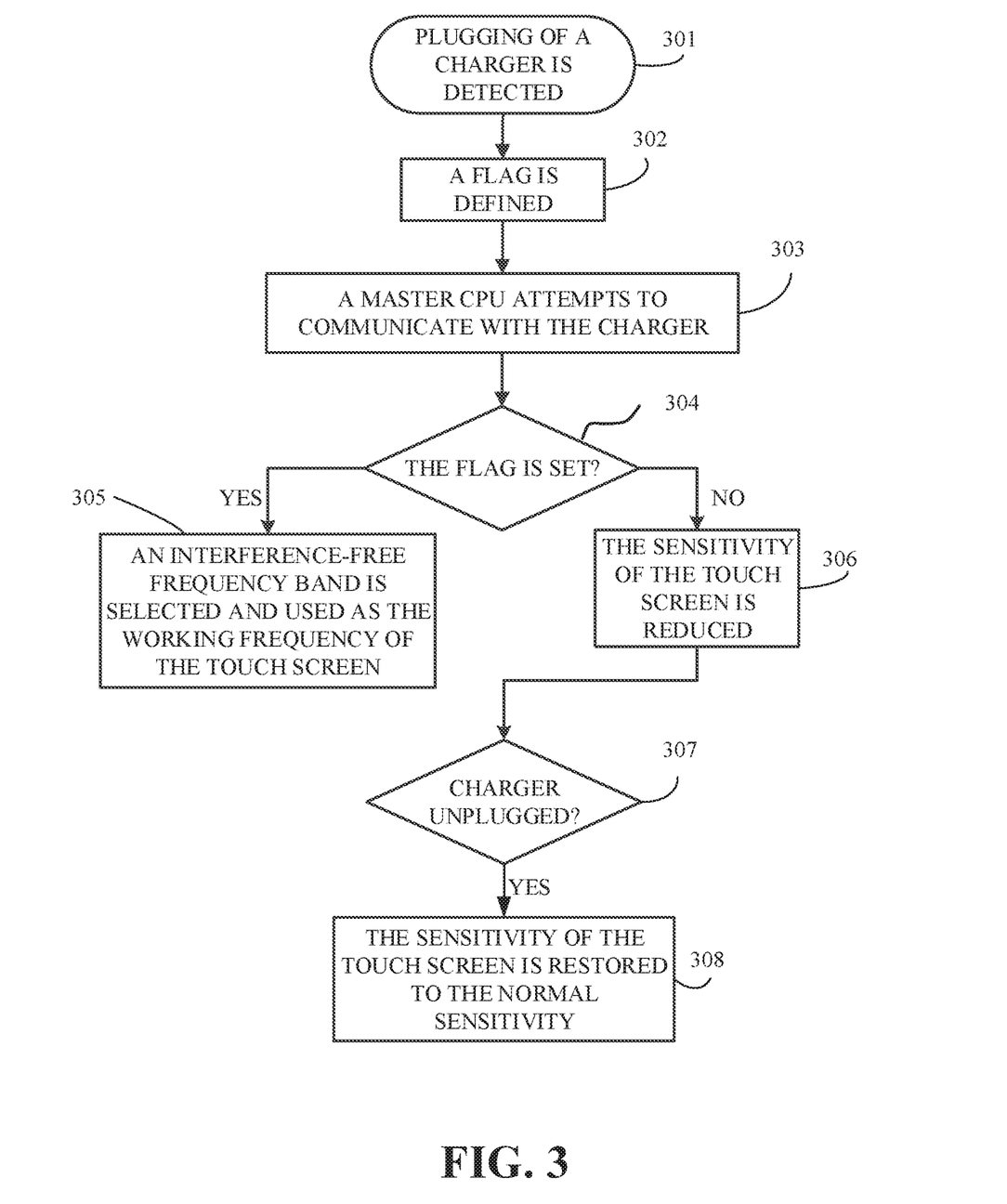
FIG. 3 is a schematic flow chart illustrating the method for eliminating the interference of a charger to a touch screen according to another implementation of the present disclosure.

FIG. 3 illustrates the method for eliminating the interference of a charger to a touch screen according to another implementation of the present disclosure. As illustrated in FIG. 3, the method can begin at block 301.

At block 301, plugging of a charger is detected by a mobile terminal.

At block 302, a flag is defined by the mobile terminal.

At block 303, the master CPU of the mobile terminal attempts to communicate with the charger.

As an implementation, if the communication between the master CPU and the charger is successful, the flag will be set, and for example, the flag can be set to 1; otherwise, if either party does not respond or the communication is unsuccessful, the flag will keep the default value.

At block 304, it is determined that whether the flag is set or not by the mobile terminal; if the flag is set, proceed to block 305, otherwise, proceed to block 306.

At block 305, it is determined that the charging mode is a quick charging mode, and an interference-free frequency band will be selected and fixed as the working frequency of the touch screen.

As an implementation, in the case of using the interference-free frequency band as the working frequency of the touch screen, the mobile terminal can write the working frequency of the touch screen into a program unit of a touch screen chip (can be referred to as "touch screen working frequency control register").

At block 306, it is determined that the charging mode is a normal charging mode (can be referred to as "slow charging mode"), and the sensitivity of the touch screen will be reduced.

As an implementation, in the case of slow charging mode, the mobile terminal can write numerical values into a program unit (can be referred to as "sensitivity control register") in the touch screen chip of the mobile terminal, so as to reduce the sensitivity of the touch screen, and this further reduce the common mode interference caused by the charger.

At block 307, it will detect whether the charger is unplugged; if yes, proceed to block 308, and at block 308, the sensitivity of the touch screen will be restored to a normal sensitivity.

What needs to be explained is, "normal sensitivity" used herein refers to the sensitivity of the touch screen before the charger is plugged into the mobile terminal.

In the method for eliminating the interference of a charger to a touch screen according to the implementation of the present disclosure, based on the charging mode determined, the mobile terminal can determine the interference frequency and the working frequency, therefore, appropriate methods for determining the interference frequency can be selected according to different charging modes; additionally, based on the charging mode determined, the mobile terminal can control the sensitivity of the touch screen, and therefore the interference of the charger to the touch screen can be further eliminated and the control experience of the touch screen can be improved.

Implementation 4

Figure 4:
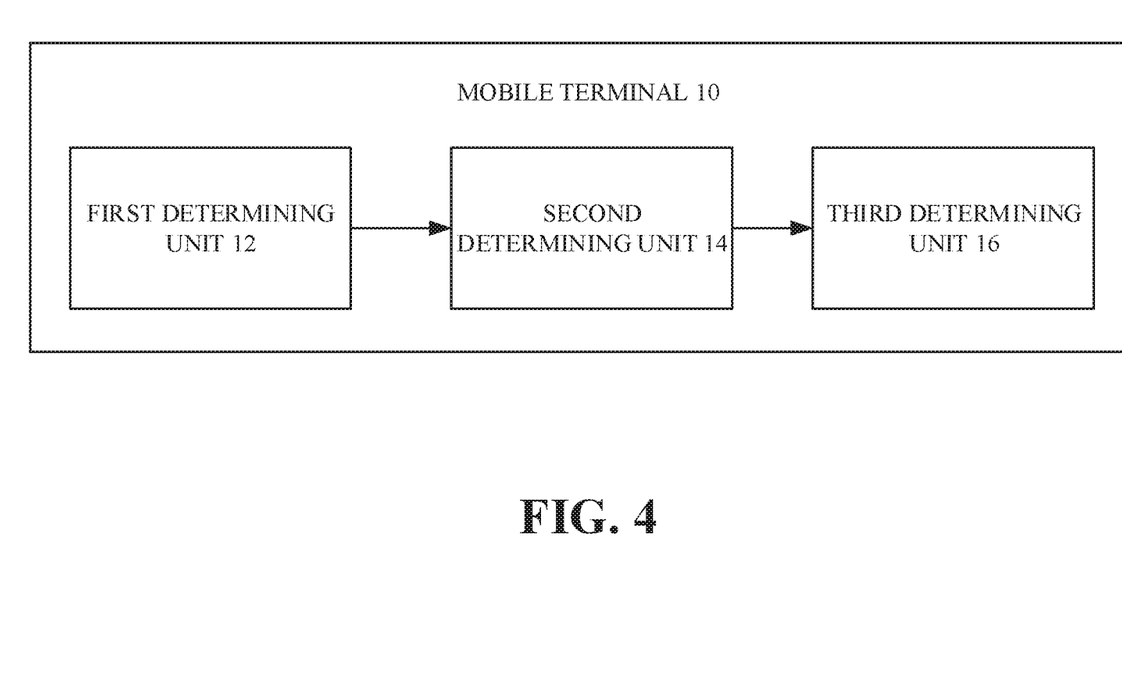
FIG. 4 is a schematic block diagram illustrating a mobile terminal according to an implementation of the present disclosure.

According to the implementation of the present disclosure, it is provided a mobile terminal, which will be described in detail with reference to FIG. 4. As illustrated in FIG. 4, a mobile terminal 10 can include a first determining unit 12, a second determining unit 14, and a third determining unit 16.

The first determining unit 12 (such as a processor, a logic device or circuit, and the like) is configured to determine a charging mode; the charging mode includes a normal charging mode and a quick charging mode, and the quick charging mode has a charging current that is higher than the charging current of the normal charging mode.

The second determining unit 14 (such as a processor) is configured to determine an interference frequency according to the charging mode determined by the first determining unit 12.

The third determining unit 16 (such as a processor) is configured to determine the working frequency of the touch screen according to the interference frequency determined by the second determining unit 14.

It should be noted that, the first determining unit 12, the second determining unit 14, and the third determining unit 16 can be implemented as separate elements or can be integrated into a single element that can be used to determine the charging mode, the interference frequency, and the working frequency, the present disclosure is not limited thereto.

According to the mobile terminal of the present disclosure, based on the charging mode determined by the first determining unit 12, the second determining unit 14 can determine the interference frequency according to the charging mode and the third determining unit 16 can further determine the working frequency of the touch screen according to the interference frequency; therefore, appropriate methods for determining the interference frequency can be selected according to different charging modes; the interference of the charger to the touch screen can be eliminated effectively and the control experience of the touch screen can be improved.

As an implementation, the second determining unit 14 is configured to determine the frequency at which the touch screen is subject to a periodic interference to be the interference frequency if the charging mode is the quick charging mode; or, the second determining unit 14 is configured to adopt a frequency adaptive algorithm to determine the interference frequency if the charging mode is the normal charging mode.

As an implementation, the third determining unit 16 is further configured to determine, among multiple preset working frequencies, a preset working frequency that has a maximum difference with the interference frequency to be the working frequency of the touch screen.

Implementation 5

Figure 5:
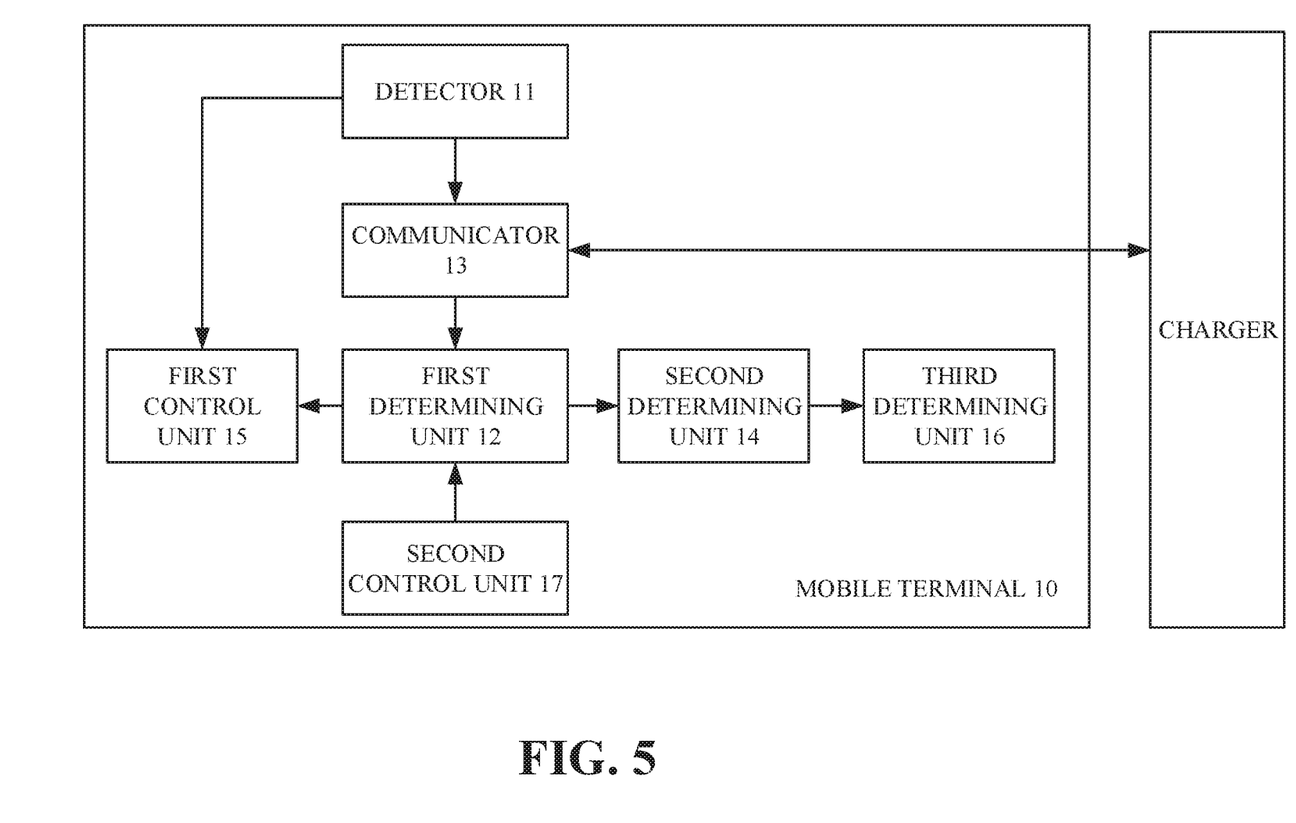
FIG. 5 is another schematic block diagram illustrating the mobile terminal according to an implementation of the present disclosure.

FIG. 5 illustrates the mobile terminal according to another implementation of the present disclosure. As illustrated in FIG. 5, on the basis of the mobile terminal illustrated in FIG. 4, the mobile terminal 10 can further include at least one of a detector 11, a communicator 13, a first control unit 15, a second control unit 17, or a combination thereof.

The detector 11 is configured to whether the charger is plugged into the mobile terminal and the communicator 13 is configured to communicate with the charger. The first determining unit 12 will determine that the charging mode is the quick charging mode if the communication between the communicator 13 and the charger is successful, or determine that the charging mode is the normal charging mode if the communication is unsuccessful.

The first control unit 15 (such as a controller or processor) is configured to determine the sensitivity of the touch screen. For example, the first control unit 15 can determine a difference between the sensitivity of the touch screen when a charger is not plugged into the mobile terminal and a preset value to be the sensitivity of the touch screen, if it is determined by the first determining unit 12 that the charging mode is the normal charging mode.

For example, the ratio of the preset value to the sensitivity of the touch screen when the charger is not plugged into the mobile terminal can be 5%.

As an implementation, the first control unit 15 is further configured to use the sensitivity of the touch screen when the charger is not plugged into the mobile terminal as a sensitivity of the touch screen if it is determined by the detector 11 that the charger is unplugged from of the mobile terminal.

The second control unit 17 (such as a controller or processor) is configured to provide a preset flag for indicating the charging mode, and set the preset flag if it is determined by the first determining unit 12 that the charging mode is the quick charging mode.

According to the mobile terminal of the present disclosure, the mobile terminal can use a flag to indicate the charging mode, after determining the charging mode, the mobile terminal can determine the interference frequency according to the charging mode and further determine the working frequency of the touch screen according to the interference frequency; besides, based on the charging mode determined, the mobile terminal can determine the sensitivity of the touch screen; therefore, appropriate methods for determining the interference frequency can be selected according to different charging modes; the interference of the charger to the touch screen can be eliminated effectively and the control experience of the touch screen can be improved.

Those of ordinary skill in the art will recognize that, the elements and algorithm steps of various examples described in connection with the implementations disclosed herein can be implemented in electronic hardware, or a combination of computer software and electronic hardware. Whether these functions are implemented in hardware or software depends on the specific application and design constraints of a technical solution. For each particular application, the skilled person can use different methods for the implementation of the described functions; however, such implementation should not be considered as a departure from the scope of the present disclosure.

Figure 6:
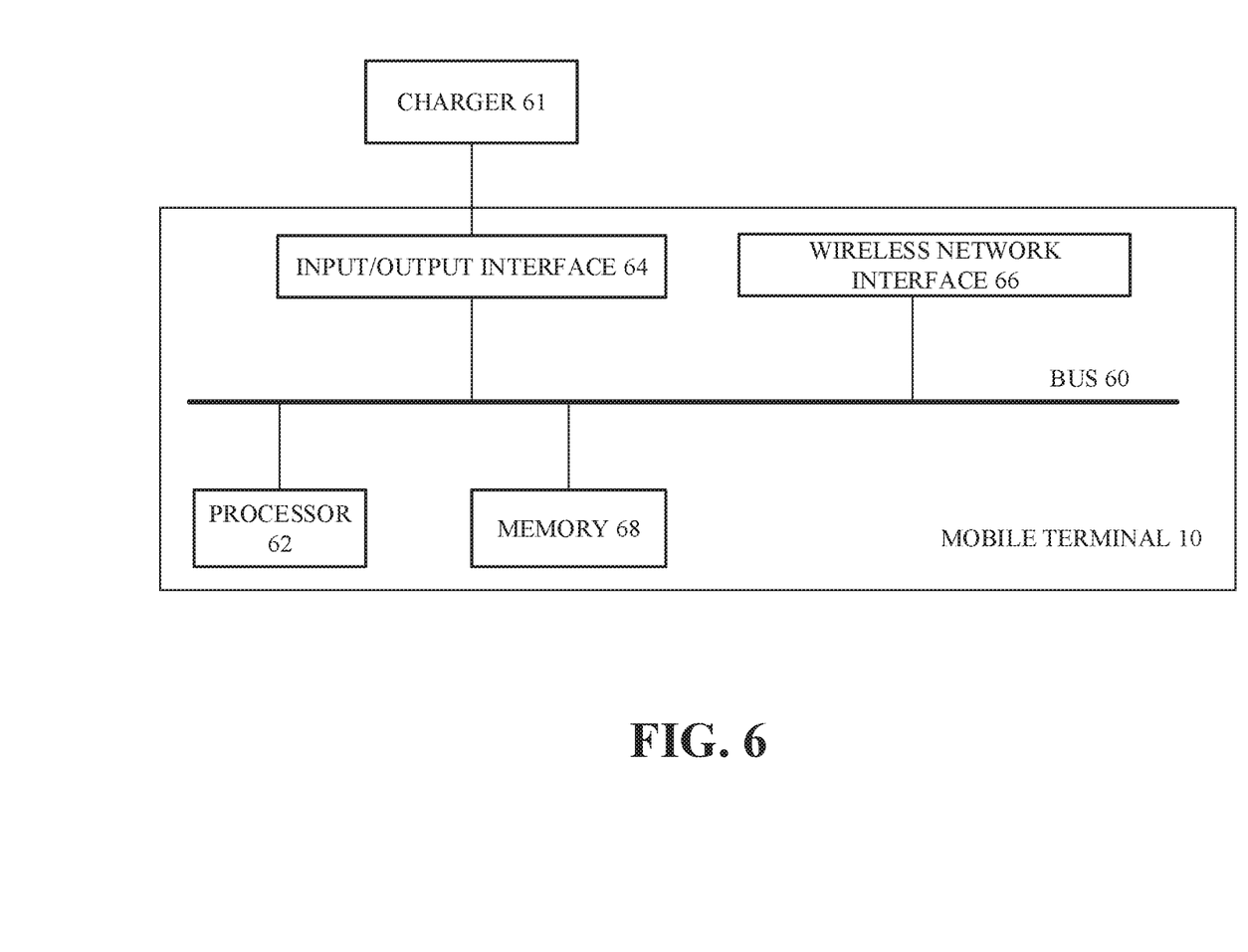
FIG. 6 is a schematic block diagram illustrating the mobile terminal according to an implementation of the present disclosure.

For example, FIG. 6 illustrates a mobile terminal according to an implementation of the present disclosure. As shown in FIG. 6, a mobile terminal 10 includes at least one processor 62 (for ease of explanation, only one is illustrated in FIG. 6) such as a CPU, a memory 68, an input/output interface 64, and a wireless network interface 66, which can be connected and communicate with each other via a BUS 60. A charger 61 can be plugged into the mobile terminal 10 via the input/output interface 64, and the charging mode of the charger includes but not limited to a normal charging mode and a quick charging mode.

The memory 68 can be Read-Only Memory (ROM), Random Access Memory (RAM) or other storage media; alternatively, the memory 68 can be storage media away from the processor 62. The memory 68 is configured to store program codes, when executed by the processor 62, the program codes are adapted to cause the processor 62 to execute the method for eliminating interference of a charger to a touch screen described above, and it will not be repeated here.

As will be apparent to those skilled in the art, for the convenience and conciseness of description, with regard to the working processes of the system, the device, and the units illustrated above, reference can be made to corresponding processes in the foregoing method implementations and will not be repeated here.

In the implementations of the present disclosure, it will be appreciated that, the system, the device, and the method disclosed can be achieved in other ways. For example, the device implementations described above are merely illustrative; the division of the units is only a logical function division, and the units can be divided into other ways during the actual implementation, for example, multiple units or components can be combined or can be integrated into another system, or some features can be ignored or not implemented. In addition, the coupling or direct coupling or communication connection illustrated or discussed between each other can be an indirect coupling or indirect communication connection via some interface, device, or unit, and it can be in electrical, mechanical or other forms.

The units illustrated as separate components can or cannot be physically separated, and the components displayed as units can or cannot be physical units, that is to say, the units or components can be located in one place, or can be distributed over multiple network elements. Some or all of these units can be selected according to actual needs to achieve the purpose of the implementations of the present disclosure.

In addition, the functional units in various implementations of the present disclosure can be integrated in one processing unit. It is also possible that the individual units are physically present individually, or, it is also possible to integrate two or more units into one unit.

When implemented in the form of a software functional unit and sold or used as a stand-alone product, the functionality can be stored in a computer readable storage medium. Based on such understanding, technical solutions of the present disclosure in essence, or in part, or part of the technical solutions which contributes to the related art, can be embodied in the form of a software product. The software product can be stored in a storage medium and include several instructions, which is configured to cause computer equipment (such as a personal computer, a server, or network equipment) to execute all or part of the method steps of the implementations of the present disclosure. The aforementioned storage medium includes U-disk, mobile hard disk, Read-Only Memory (ROM), Random Access Memory (RAM), disk, CD, or various media that can store program code.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for eliminating interference of a charger to a touch screen of a mobile terminal, comprising:
   determining a charging mode, wherein the charging mode comprises a normal charging mode and a quick charging mode, and a charging current of the quick charging mode is higher than a charging current of the normal charging mode;
   determining an interference frequency according to the charging mode, the interference frequency being a frequency at which common-mode interference occurs when the mobile terminal is coupled with the charger; and
   one of:
      determining, from multiple preset working frequencies, a preset scanning frequency having a maximum difference from the interference frequency as a scanning frequency of the touch screen; or
      determining a frequency different from the interference frequency as a scanning frequency of the touch screen.

2. The method of claim 1, wherein determining the interference frequency according to the charging mode comprises:
   determining a frequency at which the touch screen is subject to a periodic interference as the interference frequency when the charging mode is the quick charging mode.

3. The method of claim 1, wherein determining the interference frequency according to the charging mode comprises:
   determining the interference frequency using a frequency adaptive technique when the charging mode is the normal charging mode.

4. The method of claim 1, further comprising: decreasing sensitivity of the touch screen when a difference between the scanning frequency and the interference frequency is less than a preset threshold.

5. The method of claim 1, further comprising:
   determining sensitivity of the touch screen according to the charging mode.

6. The method of claim 5, further comprising:
   determining a difference between the sensitivity of the touch screen when the charger is not plugged into the mobile terminal and a preset value as the sensitivity of the touch screen, when the charging mode is the normal charging mode.

7. The method of claim 6, wherein a ratio of the preset value to the sensitivity of the touch screen when the charger is not plugged into the mobile terminal is 5%.

8. The method of claim 1, wherein determining the charging mode comprises:
   determining that the charger is plugged into the mobile terminal;
   establishing communication with the charger; and at least one of:
      determining that the charging mode is the quick charging mode when the communication is successful; and
      determining that the charging mode is the normal charging mode when the communication is unsuccessful.

9. The method of claim 8, further comprising:
   determining that the charger is unplugged from the mobile terminal; and
   determining sensitivity of the touch screen when the charger is not plugged into the mobile terminal as sensitivity of the touch screen.

10. The method of claim 1, further comprising:
    providing a preset parameter for indicating the charging mode; and
    setting the preset parameter when the charging mode is the quick charging mode.

11. A mobile terminal, comprising:
at least one processor; and
a memory coupled with the at least one processor and configured to store programs which, when executed by the at least one processor, are operable with the at least one processor to:
determine a charging mode, wherein the charging mode comprises a normal charging mode and a quick charging mode, and a charging current of the quick charging mode is higher than a charging current of the normal charging mode;
determine an interference frequency according to the charging mode, the interference frequency being a frequency at which common-mode interference occurs when the mobile terminal is coupled with a charger; and
determine, from multiple preset working frequencies, a preset scanning frequency having a maximum difference from the interference frequency as a scanning frequency of the touch screen; or determine a frequency different from the interference frequency as a scanning frequency of the touch screen.

12. The mobile terminal of claim 11, wherein the programs are further operable with the at least one processor to determine a frequency at which the touch screen is subject to a periodic interference as the interference frequency when the charging mode is the quick charging mode.

13. The mobile terminal of claim 11, wherein the programs are further operable with the at least one processor to adopt a frequency adaptive algorithm to determine the interference frequency when the charging mode is the normal charging mode.

14. The mobile terminal of claim 11, wherein the programs are further operable with the at least one processor to determine a difference between sensitivity of the touch screen when a charger is not plugged into the mobile terminal and a preset value as the sensitivity of the touch screen, when the charging mode is the normal charging mode.

15. The mobile terminal of claim 14, wherein the programs are further operable with the processor to determine the sensitivity of the touch screen when a charger is not plugged into the mobile terminal as the sensitivity of the touch screen, when the charger is unplugged from the mobile terminal.

16. The mobile terminal of claim 11, wherein the programs are further operable with the at least one processor to:
detect that whether a charger is plugged into the mobile terminal;
establish communication with the charger when it is detected that the charger is plugged into the mobile terminal; and
determine that the charging mode is the quick charging mode when the communication is successful, or determine that the charging mode is the normal charging mode when the communication is unsuccessful.

17. The mobile terminal of claim 11, wherein the programs are further operable with the at least one processor to provide a preset parameter used to indicate the charging mode, and set the preset parameter when the charging mode is the quick charging mode.

18. A method for eliminating interference of a charger to a touch screen of a mobile terminal, comprising:
detecting whether a charger is plugged into the mobile terminal; and
establishing communication with the charger when it is detected that the charger is plugged into the mobile terminal;
determining that a charging mode is the quick charging mode when the communication is successful, or determining that the charging mode is the normal charging mode when the communication is unsuccessful, a charging current of the quick charging mode is higher than a charging current of the normal charging mode;
determining an interference frequency according to the charging mode, the interference frequency being a frequency at which common-mode interference occurs when the mobile terminal is coupled with the charger; and
determining a scanning frequency of a touch screen according to the interference frequency determined.

19. The method of claim 18, further comprising:
determining a difference between the sensitivity of the touch screen when the charger is not plugged into the mobile terminal and a preset value as the sensitivity of the touch screen, when the charging mode is the normal charging mode.

20. The method of claim 19, wherein determining the interference frequency according to the charging mode comprises one of:
determining a frequency at which the touch screen is subject to a periodic interference as the interference frequency when the charging mode is the quick charging mode; or
determining the interference frequency using a frequency adaptive technique when the charging mode is the normal charging mode.

* * * * *